United States Patent

Gouyon et al.

[11] Patent Number: 5,577,887
[45] Date of Patent: Nov. 26, 1996

[54] METALLIC LIP SEAL AND TURBO JET ENGINE EQUIPPED WITH SAID SEAL

[75] Inventors: Philippe A. C. Gouyon, Montreuil; Jérôme E. R. Jolu, Pringy; Gilles C. Meunier, Le Mee sur Seine; Jacques A. A. Rauner, Vulaines sur Seine; Patrice J.-M. Rosset, Le Mee sur Seine, all of France

[73] Assignee: Societe Nationale d'Etude et de Construction de Moteurs d'Aviation "Snecma", Paris, France

[21] Appl. No.: 494,694

[22] Filed: Jun. 26, 1995

[30] Foreign Application Priority Data

Jul. 6, 1994 [FR] France .................... 94 08329

[51] Int. Cl.⁶ ............................. F01D 11/00; F01D 25/24
[52] U.S. Cl. .................... 415/174.2; 415/173.7; 277/25; 277/95
[58] Field of Search ............ 415/174.2, 174.3, 415/173.7; 416/198 A; 277/25, 95

[56] References Cited

U.S. PATENT DOCUMENTS

| | | | |
|---|---|---|---|
| 2,729,476 | 1/1956 | Duggan | 277/25 |
| 2,797,067 | 6/1957 | Fisher | 277/95 |
| 3,754,766 | 8/1973 | Asplund | 415/173.7 |
| 4,820,119 | 4/1989 | Joyce | 415/173.7 |
| 5,118,120 | 6/1992 | Drerup et al. | 415/174.2 |
| 5,402,636 | 4/1995 | Mize et al. | 415/173.7 |

FOREIGN PATENT DOCUMENTS

| | | | |
|---|---|---|---|
| 0272966 | 6/1988 | European Pat. Off. | |
| 2620762 | 4/1977 | Germany. | |
| 771124 | 3/1957 | United Kingdom | 416/198 A |
| 2188121 | 9/1987 | United Kingdom | 415/170.1 X |

Primary Examiner—Edward K. Look
Assistant Examiner—Michael S. Lee
Attorney, Agent, or Firm—Oblon, Spivak, McClelland, Maier & Neustadt, P.C.

[57] ABSTRACT

The seal prevents any particles absorbed by the turbo jet engine from sliding between the upper surface of the disk (1) of the high pressure turbine and the labyrinth (2) secured to the latter.

This seal includes a body (5C) placed in a cavity (6) of the labyrinth (2) and a lip (5L) resting on the upper surface (1AM) of the disk (1) so that on stopping there is a small space (6) between the labyrinth (2) and the seal (5).

Application for all aircraft turbo jet engines.

FIG. 2.

8 Claims, 2 Drawing Sheets

METALLIC LIP SEAL AND TURBO JET ENGINE EQUIPPED WITH SAID SEAL

FIELD OF THE INVENTION

The present invention relates to the assurance of seal tightness between elements in turbo engines, such as turbo jet engines, especially as regards the high pressure turbine.

BACKGROUND OF THE INVENTION

Aircraft turbo engines, such as turbo jet engines on aircraft, are used in all areas of the world and in particular atmospherically polluted areas. In particular, a sandy environment having fine sand size grading has an adverse affect on the functioning of turbo jet engines since extremely fine particles of sand are sucked up by these machines and are thus confronted with the air flow which is also sucked up.

With reference to FIG. 1, these particles are brought to the base of the front face 1AM of the disk 1 of the turbine which rotates around the axis A. Secured to this disk 1 is a labyrinth 2 whose outer ribbings 2N constitute an obstacle to the leaks of the cool flow from the turbine. This labyrinth 2 is secured to the disk 1 by means of tie rods or several bolts 3 which clamp the foot 2P of the labyrinth 2 against the upper surface 1AM of the disk 1. A step 2R of the labyrinth 2 extends from the other side, that is towards the axis A of the unit, constituting a sort of inner crown. Some of the particles sucked up by the turbo jet engine accordingly strike this upper surface 1AM and become housed behind the step 2R of the labyrinth 2. Having regard to the fact that considerable centrifugal forces are exerted on these mechanical elements, the step is slightly bent and may tend to widen, that is be distanced from the axis A of the turbo jet engine and deviate from the upper surface 1AM of the disk 1. It can be easily understood that the particles can then be housed between the disk 1 and the labyrinth 2, namely between the upper surface 1AM of the disk and the lower surface 2AV of the labyrinth 2.

There are certain drawbacks to this particular situation, namely:

plastic warping of the bolts 3 linking the labyrinth 2 to the disk 1 resulting in a loss of tightness between these two elements;

presence of cracks, fissures or loss of fragments of the labyrinth 2, and increase of the play between the step 2R of the labyrinth 12 and the disk 1 resulting in a leak concerning the ventilation flow of the vanes 4 of the turbine and thus causing heating of the latter.

SUMMARY OF THE INVENTION

An object of the invention is to therefore resolve these drawbacks by offering a seal specially adapted to this particular situation.

The main object of the invention concerns providing a metallic lip seal including:

a toric-shaped body having a specific axis and diameter, and a toric lip secured to the body and extending towards the axis and on the side so as to exhibit at one extremity an outer imperviousness contact surface for a radial surface of another object, the lip being flexible so as to allow for tightening in a fork by several tenths of a millimeter.

This lip seal is preferably made of an NC19FeNb alloy.

Maximum effectiveness of the seal is obtained when the thickness of the lip is equal to about 0.5 mm.

In its preferred embodiment, the body of the seal is sufficiently solid so that the center of gravity of the seal is located inside the body or close to the latter.

The seal is preferably a forge blank where fiber orientation is fixed.

A second main object of the invention is to provide a turbo engine comprising:

high pressure turbine vanes fixed to a turbine disk, and a labyrinth secured to the upper face of the disk via a lower surface which moves it from the upper surface of the disk towards the inside of the disk.

According to the invention, this turbo engine includes a seal as previously described and is secured to the lower surface of the labyrinth at a location where the latter is distanced from the disk and has an inner lip which is applied to the upper surface of the disk so as to ensure imperviousness of the unit when functioning.

In a case where the labyrinth extends towards the axis of the turbo engine by a step deviating from the disk and having an inner axial surface, a cavity is hollowed and placed on this inner axial surface opposite the disk so as to place the body of the seal in this cavity with play between the bottom of the cavity and the outer surface of the seal so as to facilitate mounting. During operation, the seal tends to be clad against the bottom of the cavity.

The seal is preferably stress-mounted, the extremity of the lip being tightened by between 0.2 and 1.2 mm on the upper face of the disk.

Said seal is preferably coated with an anti-seizing material.

BRIEF DESCRIPTION OF THE DRAWINGS

The invention and its various characteristics shall be more readily understood from a reading of the following description accompanied by the two figures, namely.

DETAILED DESCRIPTION OF THE PREFERRED EMBODIMENT

Figure 1:
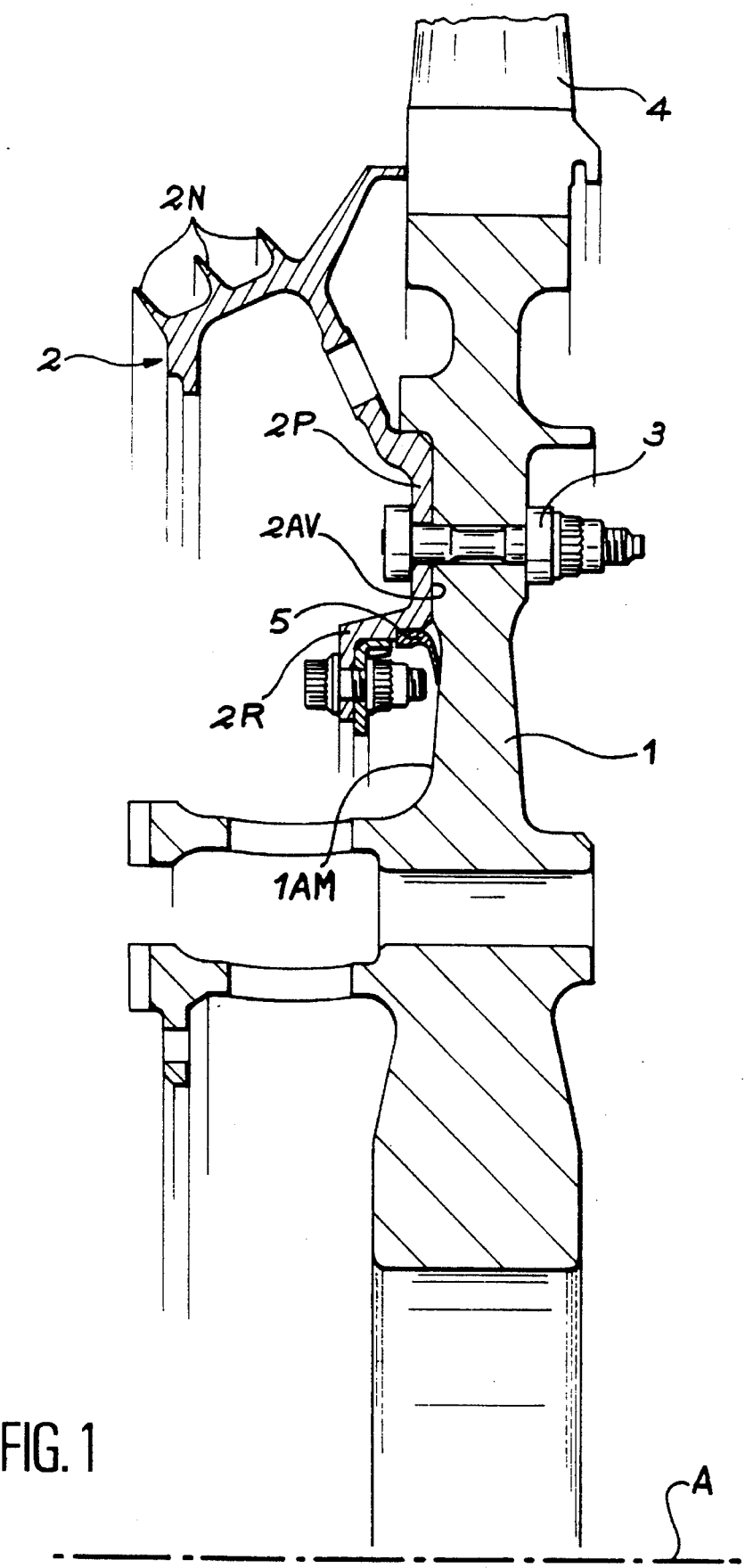
FIG. 1 is a half-sectional view of the disk of the high pressure turbine of a turbo jet engine and the seal of the invention placed on the latter.

On FIG. 1, the seal of the invention is given the reference 5. The seal 5 is placed against the lower surface 2AV of the labyrinth 2 in the step 2R. The intended purpose step 2R of the labyrinth is to enable the balancing feeders to be fixed by bolts 7 represented by the dot-and-dash lines on FIG. 2 passing into holes 8 of the step 2R of the labyrinth. This presence of the step thus favors the placing of the seal 5.

Figure 2:
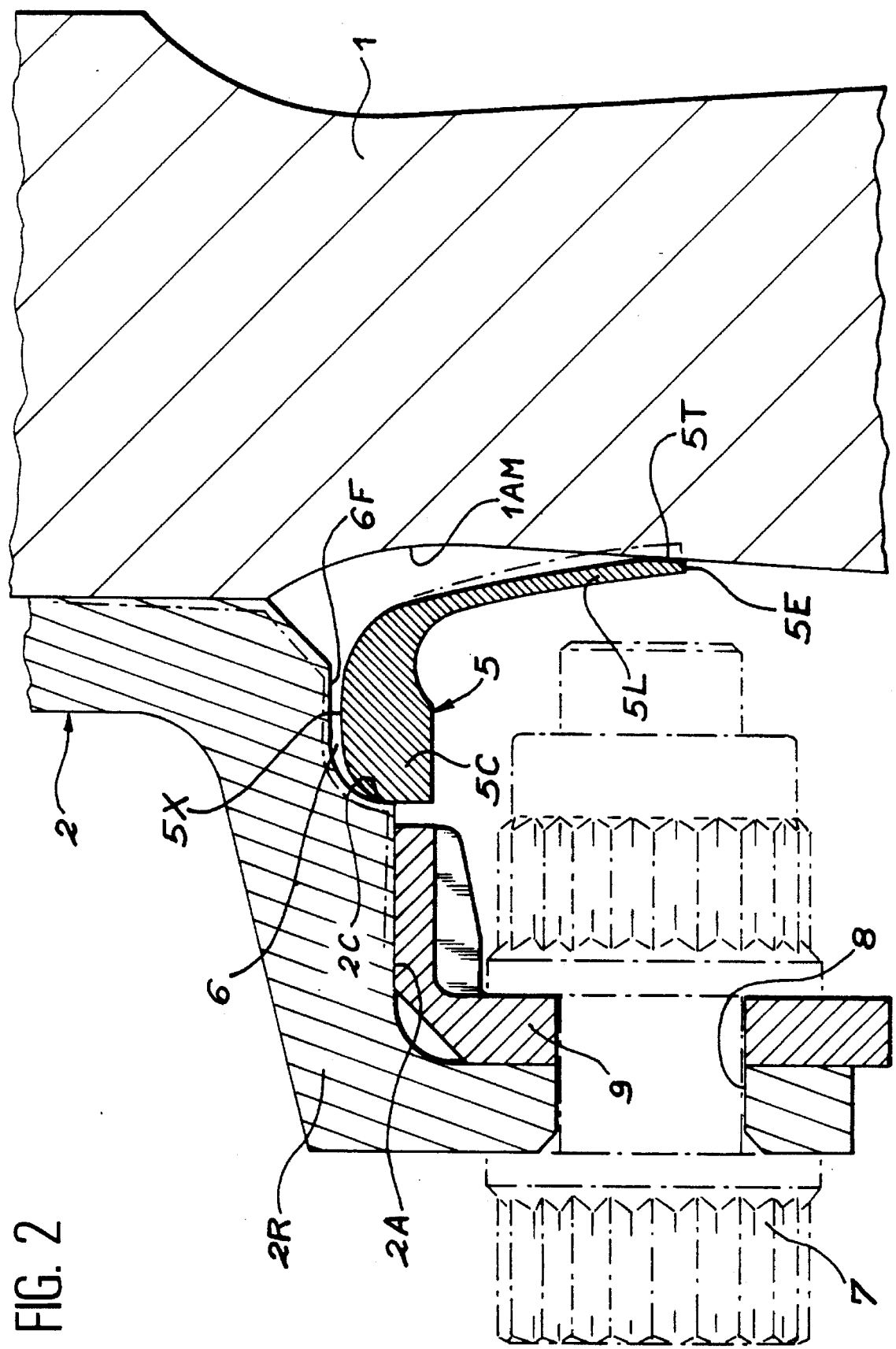
FIG. 2 is a partial cutaway view of the seal of the invention and installed on the disk of FIG. 1.

FIG. 2 shows the details of this installation. It shows the disk 1, the step 2R of the labyrinth and the seal 5. The latter also includes a rather solid body 5C and a lip 5L extending onto the side of the body 5C in the direction of the axis (not shown on this figure) of the disk 1. In other words, the diameter of the extremity 5E of the lip 5L is smaller than the external diameter of the external surface 5X of the body 5C of the seal 5.

In order to position the seal 5 on the axial surface 2A of the step 2R, a cavity is made with a shape complementary to the external surface 5X of the body 5C of the seal 5. In the present case, this cavity 6 has a flat bottom portion and a relatively wide quarter circle so as to enable the body 5C to be housed there.

The dot-and-dash lines show a second position of the lip 5L. This symbolizes its flexibility so as to enable the seal to be adapted to various positions or positionings of the disk 1. This flexibility or adjustment needs to have a value of between 0.2 and 1.2 mm. To this effect, the thickness of the extremity 5E of the seal needs to be about 0.4 mm.

In other words, when the seal is placed, its extremity 5E rests via its external contact surface 5T on the upper surface 1AM of the disk 1 with a particular force so that, if the disk 1 is removed, the extremity 5E of the lip 5L shall have a position defined by the two dimensions 0.2 and 1.2 mm with respect to the initial position it has when clamped against the disk 1. The phantom position suggested by the dot-and-dash lines symbolizes this clearance.

Secondly, when the motor is idle, there is a space in the cavity 6 between the bottom 6F of the cavity and the external surface 5X of the seal 5, that is when the unit does not rotate. On the other hand, during functioning, as the centrifugal forces are considerable, the seal 5, whose center of gravity is located in the body 5C, tends to move away from the axis A of the engine, having regard to the relative weight of said body.

In other words, the external diameter of the external surface 5X tends to increase and the seal 5 tends to become glued to the bottom 6F of the cavity 6. This increases the quality of contact of the seal 5 on the disk 1 and accordingly the effectiveness of imperviousness. In other words, the centrifugal forces tend to elastically clad the seal 5 against the disk 1 so as to cause the seal to be effectively fixed to the disk by centrifugal forces.

A plastic warping of the seal 5 is tolerated when mounting the latter so that it adapts itself to the geometry of the disk 1 and that of the labyrinth 2 yet without impairing its functional elasticity qualities. This warping thus generates the support force due to tightening on the adjacent components which favors keeping the seal 5 in place. In conclusion, the seal 5 is stress-mounted. So as to avoid marking the elements adjacent to the seal 5, said seal may be equipped with an anti-seizing coating made of graphite, for example.

The space between the seal 5 and the cavity 6 may vary as it depends on a combination of the dimensional tolerances of these two components. During functioning, the contact of the seal 5 at the bottom 6F of the cavity is not essential but may occur. It depends on the stacking of the tolerances made in this mounting.

A metal particularly well-adapted to the construction of the seal of the invention is a nickel-chromium alloy, namely NC19FeNb.

The seal is preferably produced from a forge blank in which a precaution has been taken so as to obtain the blank shape by observing a fiber orientation of the metal.

There are two main advantages of the invention, namely:

the technique user is simple and the dimensional tolerances are wide by virtue in particular of the system of the space between the seal 5 and the cavity 6 of the labyrinth 2, and the system is able to equip existing turbo jet engines.

What is claimed is:

1. A metallic lip seal comprising:

a lip secured to a body and extending from a side of the body, said lip having an extremity which includes an external sealing contact surface which contacts a radial surface of an object, the lip extending toward an axis of the object, the lip being flexible so as to permit the seal to adjust to various positions with respect to the object, wherein the body is a toric body with a specific axis and an external diameter, the body being sufficiently solid so that a center of gravity of a cross section of the seal is located substantially in the body.

2. A seal according to claim 1, wherein the seal is formed of a nickel-chromium alloy.

3. A seal according to claim 1, wherein a thickness of the lip is equal to about 0.5 mm.

4. A seal according to claim 1, wherein the seal is produced from a forge blank where fiber orientation is fixed.

5. A turbo engine comprising:

turbine vanes fixed to a turbine disk; and a labyrinth secured to an upper surface of the disk via a lower surface of the labyrinth which is spaced from the upper surface of the disk, wherein the labyrinth includes a seal which is secured to the lower surface of the labyrinth at a location where the labyrinth is spaced from the disk, the seal having a lip which is applied to the upper surface of the disk so as to ensure a seal tightness between the seal and the disk while the turbo engine is functioning.

6. A turbo engine according to claim 5, wherein the labyrinth includes a step which extends towards an axis of the turbo engine and in a direction away from the disk, the step having an internal axial surface which includes a cavity, a body of the seal being placed in the cavity, the cavity being sized so as to provide for a spacing between a bottom of the cavity and an external surface of the seal so that when the turbo engine is functioning, the seal tends to be urged against the bottom of the cavity.

7. A turbo engine according to claim 6, wherein the seal is mounted stressed with an extremity of the lip which is in contact with the upper surface of the disk, wherein S is a position of contact between the extremity of the lip and the upper surface of the disk which is in the range of 0.2 mm<S<1.2 mm.

8. A turbo engine according to claim 6, wherein the seal is coated with an anti-seizing material.

* * * * *